United States Patent Office 3,721,891
Patented Mar. 20, 1973

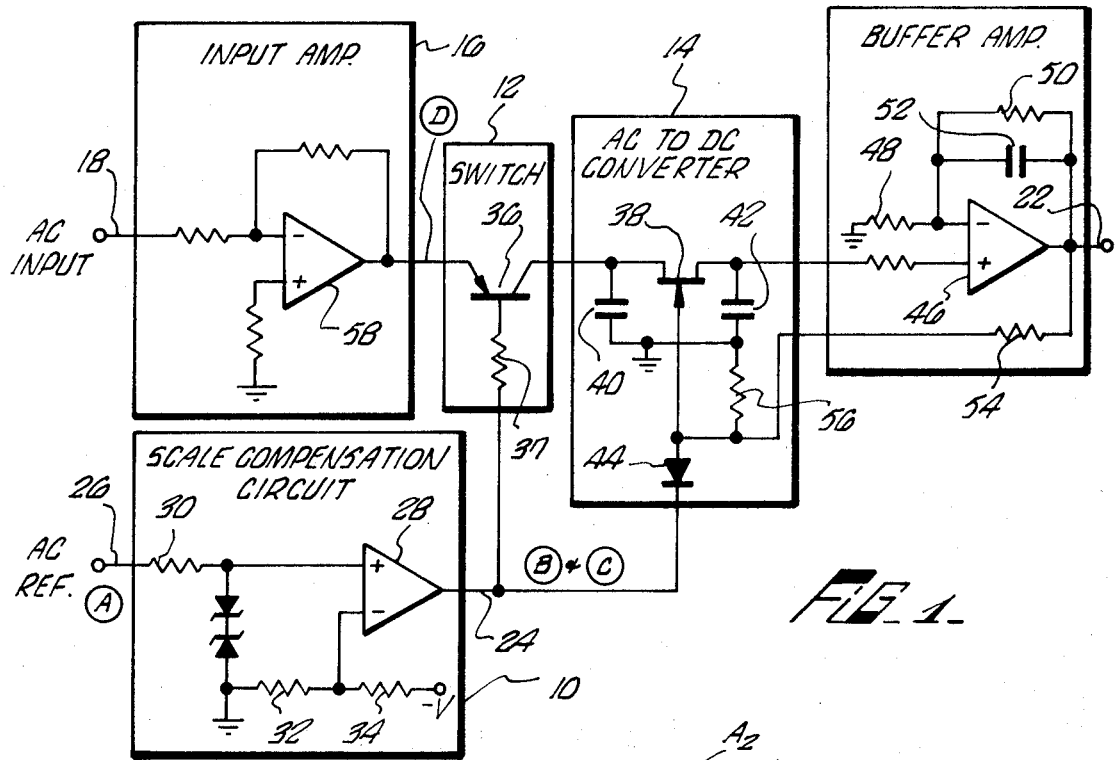
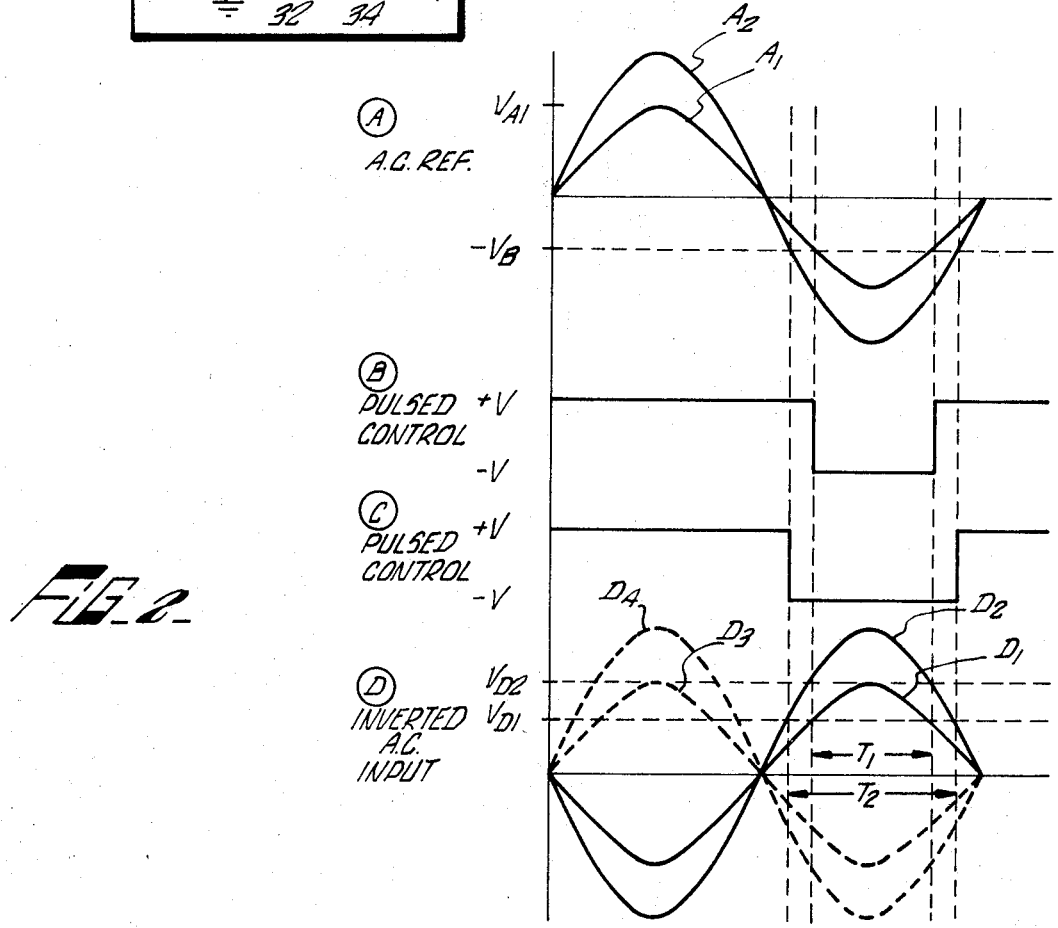

3,721,891
POWER NORMALIZED DEMODULATOR
Adrian J. Moses, Newhall, Calif., assignor to Lear Siegler, Inc., Santa Monica, Calif.
Filed Apr. 13, 1972, Ser. No. 243,689
Int. Cl. H02m 7/20
U.S. Cl. 321—47         13 Claims

ABSTRACT OF THE DISCLOSURE

A power normalized demodulator circuit that compensates for scale factor changes in the accurate conversion of AC input signals to DC output signals, is disclosed. AC reference signals are applied to a scale compensation circuit that operates to provide pulsed control signals the pulse width of which is varied in accordance with amplitude changes of the AC reference signal which are attributable to scale factor changes. The pulsed control signal serves to control the time period during which a switching device is enabled. Controlling such time period permits control of the level of voltage applied as an input to an AC to DC converter circuit. The pulsed control signal also serves to control operation of the AC to DC converter circuit which includes another switching device that is cyclically rendered conductive by the pulsed control signal to permit the discharge of an input capacitor through the converter switching device to charge an output capacitor. The voltage to which the output capacitor is charged essentially constitutes the desired DC output signal. However, a buffer amplifier stage is employed to provide a high impedance for the converter and the provide a nominal gain.

BACKGROUND OF THE INVENTION

(1) Field of the invention

This invention generally relates to demodulator circuits for providing a DC output signal having a magnitude that is a function of the amplitude of an AC input signal. More specifically, the present invention concerns a demodulator circuit that compensates for amplitude variations of the AC input signal, resulting from scale factor changes, to have the magnitude of the DC output signal independent of such scale factor changes.

(2) Description of the prior art

Demodulator circuits of the type designed to operate as AC to DC converters are commonly used in control systems. An example would be a control system in which a DC signal is required to drive a servo system in response to AC error signals. The amplitude of the AC input signal may be the factor that determines the magnitude of the DC output signal such that increases in the amplitude of the AC input signal will produce proportional changes in the magnitude of the DC output signal.

Typically, scale factor changes such as may result from changes in the power supply circuitry, transitional ratio changes, etc., are tolerated or accommodated at the load to which the DC output signal is applied. However, where the load to which the DC output signal is applied will not tolerate or accommodate such scale factor changes, the DC output signal must be made independent of such variations to obtain accurate control.

It is accordingly the intention of the subject invention to provide an improved demodulator circuit which includes circuitry for detecting, and compensating for, scale factor changes that affect the amplitude of AC input signals such that the magnitude of DC output signals is independent of such scale factor changes while remaining a function of the amplitude of AC input signals applied thereto.

SUMMARY OF THE INVENTION

Briefly described, the present invention involves a power normalized demodulator for providing DC output signals in response to AC input signals wherein the magnitude of such DC output signals is independent of amplitude variations in the AC input signal that are attributable to scale factor changes.

More specifically, the subject power normalized demodulator includes a scale compensation circuit to which AC reference signals are applied as inputs. The scale compensation circuit provides a pulsed control signal including pulses having a width that is varied in accordance with amplitude changes of the AC reference signal. The pulsed control signal is applied to control the conductive period of a switching circuit and thereby control the level of voltage applied to charge an input capacitor of an AC to DC converter circuit. The pulsed control signal is also applied to the AC to DC converter circuit to control the discharge of the input capacitor through a semiconductor device, when rendered conductive, to charge an output capacitor. The voltage to which the output capacitor is continually charged constitutes the desired DC voltage signal. A buffer amplifier stage may be employed to transfer the DC voltage signal to a load and to provide a high output impedance for the AC to DC converter circuit.

The objects and many attendant advantages of the invention will be more readily appreciated as the same becomes better understood by reference to the following detailed description which is to be considered in connection with the accompanying drawings wherein like reference symbols designate like parts throughout the figures thereof.

BRIEF DESCRIPTION OF THE DRAWINGS

FIG. 1 is a schematic block diagram illustrating a power normalized demodulator circuit in accordance with the present invention.

FIG. 2 is a graphic diagram illustrating a series of waveforms which are useful in describing the operation of the circuitry illustrated by FIG. 1.

DESCRIPTION OF THE PREFERRED EMBODIMENT

Referring briefly to FIG. 2, waveforms D1 and D2 respectively illustrate two AC signals of different amplitudes; but of equal frequency. Assuming that portions of the respective signals are applied to charge a capacitor during the period designated $T_1$, the signal D1 will charge the capacitor to a voltage level $V_{D1}$, the amplitude of the signal at the end of the period $T_1$. By comparison, the signal D2 will charge the capacitor to a voltage level $V_{D2}$, corresponding to the amplitude of the signal D2 at the end of the period $T_1$. Where the increased amplitude of the signal $V_{D2}$, as compared to the signal $V_{D1}$, is due to a scale change, i.e., variations in the power supply circuitry, etc., the amplitude of DC signals produced by an AC to DC conversion will undesirably reflect such scale change. However, if the time period during which the AC signals are applied to charge a capacitor is varied, i.e., in this case increased, the level to which the capacitor would be charged, may be controlled to be constant. As shown, if the time period $T_1$ is increased to $T_2$ the voltage to which the capacitor would be charged by the application of the signal D2 would be $V_{D1}$. The increased amplitude of the signal D2, when resulting from a scale change, can thus be compensated for to have DC signals produced in an AC to DC conversion be independent of such scale factor changes. Where the increased amplitude of the signal D2 is not attributable to scale factor changes, the time period, may be left unchanged and the DC output signal provided by an AC to DC converter would then be proportionally changed in accordance with the amplitude of the AC input signal.

Referring now to FIG. 1, a power normalized demodulator circuit in accordance with the present invention essentially includes a scale compensation circuit 10 which controls the operation of a switching device 12, and AC to DC converter circuit 14. An input amplifier 16 serves to couple AC input signals from an input terminal 18 to the switching device 12. A buffer amplifier 20 serves to provide DC output signals from the inverter circuit 14 to an output terminal 22.

The scale compensation circuit 10 serves to generate a pulsed control signal at an output lead 24 in response to the application of AC reference signals (see waveforms A, FIG. 2) to an input terminal 26. The pulsed control signal may be considered as essentially including a series of negative-going pulses as illustrated by waveforms B and C, FIG. 2. The width of these negative pulses is representative of the period during which the AC reference signal is more negative than a negative reference voltage level i.e., $-V_B$.

The pulsed control signals are applied to both the switching device 12 and to the converter circuit 14. The switching device 12 is rendered conductive for the duration of the negative-going pulses while a FET switch, or the like, included in the converter circuit 14 is disabled for the duration of the negative pulses. The regulated cyclic operation of the switching device 12 permits control of the effective amount of charging current that is transmitted to the converter 14. This control permits compensating for the effects of any amplitude changes due to scale factor variations such that the amplitude of the DC output signals provided by the converter circuit 14 are independent of such scale factor changes.

DC output signals provided by the converter circuit 14 are applied to the output terminal 22 via the buffer amplifier 20. The buffer amplifier 20 is intended to have nominal gain and essentially serves to provide a high output impedance for the converter circuit 14.

Considering the subject invention in greater detail, AC reference signals applied to the scale compensation circuit 10 via the terminal 26 are applied to the non-inverting input terminal of an operational amplifier 28 via an input resistor 30. The inverting input terminal of the operational amplifier 28 is maintained at a selected reference voltage by using a pair of resistors 32 and 34 to form a conventional voltage divider. In this case, the voltage divider maintains the inverting terminal at a negative reference voltage. A pair of oppositely biased, serially connected, Zener diodes connect the non-inverting input terminal of the operational amplifier 28 to ground potential. These Zener diodes serve to protect the amplifier from damage due to the non-inverting input terminal receiving input voltages exceeding the supply voltage of the amplifier, i.e., when input voltages exceed the positive supply voltage, the non-inverting input terminal will be clamped at the positive supply voltage.

Referring to the waveforms $A_1$ and $A_2$ of FIG. 2, the AC reference signal illustrated by the waveform $A_1$ is applied to the input terminal 26. If the negative reference voltage applied to the inverting input terminal of the amplifier 28 is $-V_B$, a negative output signal will be provided whenever the signal $A_1$ is more negative than the bias voltage $-V_B$.

As a practical matter, the amplifier 28 may be connected in a conventional manner to have the output thereof clamped at either a selected positive voltage or at a corresponding negative voltage depending on the comparative amplitude of the input signal applied to the non-inverting terminal with respect to the reference voltage applied to the inverting terminal of the amplifier 28. Accordingly, in this case, waveform B of FIG. 2 illustrates the output of the scale compensation circuit 10 that is produced by the operational amplifier 28 when the signal $A_1$ is applied at the terminal 24.

If the amplitude of the AC reference signal applied at the input terminal 26 is increased, as illustrated by the waveform $A_2$, the period of time during which the signal is more negative than the reference voltage $-V_B$ will also be increased. As a result, the time period during which the amplifier 28 is clamped to provide a negative output will also be increased as illustrated by the waveform C of FIG. 2. Otherwise stated, the width of negative pulses provided by the amplifier 28 will be increased as a function of amplitude increases of the AC reference signal, and vice versa. Since such amplitude variations of the AC reference signal are due to scale factor changes, and the like, the width of the negative pulses will vary in accordance with, and be indicative of, such scale factor changes.

The switching device 12 may simply be a conventional semi-conductor device such as a PNP transistor 36 having the base lead thereof connected to receive the output of the scale compensation circuit 10 via a current limiting resistor 37. The negative going pulses may be used to bias the transistor 36 into conduction. The period during which the transistor 36 is conductive would be controlled by the width of the negative pulses and would hence vary with changes in the amplitude of the AC reference signal. Since the amplitude of the AC reference signal is intended to vary only as a result of scale factor changes, and other similar undesirable fluctuations, the period during which the transistor 36 is conductive will only be varied to compensate for the undesired changes.

The amplitude of the AC input signal applied to the terminal 18 will also be increased by an amount proportional to the amplitude change of the AC reference signal. However, the correspondingly increased amplitude of the AC reference signal will alter the period during which the transistor 36 is conductive to control the level of the signal applied through the switching device 12 to be constant. Where the amplitude of the AC input signal is increased independent of a scale factor change, then the negative control pulses from the compensation circuit 10 would be unmodified since the AC reference signal remains at a constant amplitude. In such case, the level of the signal applied through the switching transistor 36 would be permitted to increase as is desired.

The AC to DC converter circuit 14 may include a field effect transistor (FET) 36, an input capacitor 40, and an output capacitor 42. As shown, the AC signal applied through the switching device 12 will charge the input capacitor 40 when the FET 38 is non-conductive. To this end, the FET 38 is connected to be rendered non-conductive by the negative pulse provided by the scale compensation circuit 10.

The input capacitor 40 will be charged to a voltage level determined by the amplitude of the AC signal applied thereto at the time when the transistor 36 is rendered non-conductive. At that time, the transistor 36 and the FET 38 are simulaneously switched, i.e., respectively rendered non-conductive and conductive, to permit the charge of the input capacitor 40 to be discharged through the FET 38 to charge the output capacitor 42. The input capacitor 40 is accordingly charged and discharged once each cycle of the AC input signal, the charge being to a voltage level that is precisely regulated by controlling the period during which the transistor 36 is maintained conductive. The output capacitor 42 may be appropriately sized to be continually charged to a voltage level that is representative of the amplitude of the AC input signals applied at the input terminal 18. It is understood that a nominal discharge of the output capacitor 42 may cause a slight "rippling" of the DC output signal. However, this rippling is readily eliminated by the use of the buffer amplifier stage 20, or some other conventional technique.

The buffer amplifier 20 may include an operational amplifier 46 having the non-inverting terminal thereof connected to receive the DC output signals provided by the converter circuit 14. The amplifier 46 may be connected in a conventional fashion to provide a nominal gain greater than unity. Accordingly, the inverting terminal thereof is connected to ground potential through a resistor 48 and a resistor 50 is connected between the output of the amplifier 46 and the inverting input terminal thereof. A capacitor 52 connected in parallel with the resistor 50 may be used to filter out switching spikes that may occur. A resistor 54 and a resistor 56 form a voltage divider which serves to maintain the gate terminal of the FET 38 at a potential equal to the potential of the source during the conducting period of the FET 38.

The input amplifier 16 primarily serves to provide a low impedance source for the emitter of the transistor 36. Where the AC input signals are already provided from a low impedance source, the input amplifier 16 may be omitted altogether. An operational amplifier 58 may be used for the input amplifier 16. As shown, the amplifier 58 may be operated as an inverting amplifier by having the AC input signals applied to the inverting terminal thereof. Such inversion of the AC input signals is not required and may be avoided such as by having the non-inverting input terminal receive the AC input signals. As illustrated by waveforms $D_1$ and $A_1$ of FIG. 2, when the AC input signal is in-phase with the AC reference signal, the DC output signals provided at the output terminal 22 will be positive. Conversely, if the AC input signals are directly out-of-phase with the AC reference signal, the DC output signal provided at the output terminal 22 will be of a negative polarity, as may be observed from waveforms D3 and D4.

It is to be understood that the operational amplifier 28 may be connected to provide positive pulses, when desired, to control the operation of the switch 12 and the inverter circuit 14. As an example, this may be simply accomplished by applying the AC reference signals to the inverting terminal of the amplifier 28. The non-inverting terminal would then be connected to receive a positive reference voltage, i.e., $+V_B$.

Proper biasing of the transistor 36 to be conductive is insured, despite the application of negative signals to the emitter thereof from the amplifier 58, by having the AC input signals not attain a voltage level more negative than the negative voltage of the pulses applied to the base terminal of the transistor 36. For example, where the negative pulse applied to the base of the transistor 36 is approximately —11 volts, the AC input signal may then be limited to a negative amplitude of approximately —7.5 volts.

From the foregoing description it may now be understood that the present invention provides a power normalized demodulator circuit for converting AC input signals to DC output signals wherein the amplitude of the DC output signals is changed in proportion to amplitude changes of the AC input signals; but is maintained independent of any amplitude changes attributable to scale factor changes, or the like.

While a preferred embodiment of the present invention has been described hereinabove, it is intended that all matter contained in the above description and shown in the accompanying drawings be interpreted as illustrative and not in a limiting sense and that all modifications, constructions and arrangements which fall within the scope and spirit of the invention may be made.

What is claimed is:

1. A demodulator circuit for providing DC output signals having a magnitude representative of the amplitude of AC input signals, the magnitude of said DC output signals being compensated to be independent of amplitude variations of said AC input signal which are attributable to scale factor changes, said demodulator circuit comprising:

scale compensation means for providing pulsed control signals having a pulse width that is varied in accordance with the amplitude of AC reference signals applied to said scale compensation means, amplitude changes of said AC reference signals being indicative of scale factor changes;

converter means for providing DC output signals having a magnitude determined by the amplitude of AC signals last applied thereto; and switching means for controlling said amplitude of AC signals last applied to said converter means by transmitting a selected portion of AC input signals to said converter means in accordance with said pulsed control signals, said selected portion being changed in accordance with said pulse width of said pulsed control signals to compensate for scale factor changes.

2. The demodulator circuit defined by claim 1, further comprising inverter means for inverting AC input signals to be applied to said switching means whereby said DC output signals provided by said converter means have a positive polarity when said AC input signals are in-phase with said AC reference signals, said DC output signals having a negative polarity when said AC input signals are directly out-of-phase with said AC reference signals.

3. The demodulator circuit defined by claim 1, said switching means including a switching device the conductivity of which is controllable, said switching device being rendered conductive by said pulsed control signals to transmit AC input signals to said converter means, said switching device remaining conductive for a period corresponding to the pulse width of said pulsed control signals.

4. The demodulator circuit defined by claim 1, said switching means including a transistor that is rendered conductive by said pulse control signals, said transistor remaining conductive for the duration of each pulse forming said pulsed control signals.

5. The demodulator circuit defined by claim 1, said scale compensation means including means for comparing the amplitude of said AC reference signal to a selected bias voltage, an output signal forming said pulsed control signal being provided when the amplitude of said AC reference signal exceeds the amplitude of said bias voltage to be more negative than a negative bias voltage or to be more positive than a positive bias voltage, the pulse width of said pulsed control signal being determined by that portion of said AC reference signal that is more negative than said bias voltage.

6. The demodulator circuit defined by claim 1, said scale compensation means including an operational amplifier connected to receive AC reference signals at the non-inverting input terminal thereof, the inverting input terminal of said operational amplifier receiving a preselected bias voltage, the operational amplifier providing a negative output voltage whenever said AC reference signal is more negative than said bias voltage, said negative output voltage constituting said pulsed control signal.

7. The demodulator circuit defined by claim 1, said converter means including an input capacitor, an output capacitor, and a semiconductor device connected between said input and output capacitors, said input capacitor being charged by AC signals applied thereto when the semiconductor device is non-conductive, said input capacitor being discharged through said semiconductor device to charge said output capacitor when said semiconductor device is conductive, said semiconductor device being rendered non-conductive by said pulsed control signals from said scale compensation means.

8. The demodulator circuit defined by claim 5, said switching means including a switching device the conductivity of which is controllable, said switching device being rendered conductive by said pulsed control signals, to transmit AC input signals to said converter means, said switching device remaining conductive for a period corresponding to the pulse width of said pulsed control signals.

9. The demodulator circuit defined by claim 8, further comprising inverter means for inverting AC input signals to be applied to said switching means whereby said DC output signals provided by said converter means have a positive polarity when said AC input signals are in-phase with said AC reference signals, said DC output signals having a negative polarity when said AC input signals are directly out-of-phase with said AC reference signals.

10. The demodulator circuit defined by claim 6, said switching means including a transistor that is rendered conductive by said pulsed control signals and maintained conductive for the duration of each pulse forming said pulsed control signals.

11. The demodulator circuit defined by claim 10, said converter means including an input capacitor, an output capacitor, and a semiconductor device connected between said input and output capacitors, said input capacitor being charged by AC signals applied thereto when the semiconductor device is non-conductive, said input capacitor being discharged through said semiconductor device to charge said output capacitor when said semiconductor device is conductive, said semiconductor device being rendered non-conductive by said pulsed control signals from said scale compensation means.

12. The demodulator circuit defined by claim 11, further comprising inverter means for inverting AC input signals to be applied to said switching means whereby said DC output signals provided by said converter means have a positive polarity when said AC input signals are in-phase with said AC reference signals, said DC output signals having a negative polarity when said AC input signals are directly out-of-phase with said AC reference signals.

13. The demodulator circuit defined by claim 12, further including a buffer amplifier for connecting the DC output signal provided by said converter means to an output terminal, said buffer amplifier providing a high output impedance for said converter means.

References Cited

UNITED STATES PATENTS

| | | | |
|---|---|---|---|
| 3,381,203 | 4/1968 | Mitchell | 321—8 R |
| 3,466,526 | 9/1969 | Cole | 321—47 X |
| 3,470,451 | 9/1969 | Arase | 321—18 |
| 3,491,252 | 1/1970 | Petrohilos | 321—8 R X |
| 3,564,387 | 2/1971 | Gadberry | 321—8 R |
| 3,585,487 | 6/1971 | McNally | 321—47 X |
| 3,629,686 | 12/1971 | Hendrikus | 321—47 X |
| 3,668,508 | 6/1972 | Archer et al. | 321—47 X |

WILLIAM M. SHOOP, Jr., Primary Examiner

U.S. Cl. X.R.

307—265, 267; 321—18; 323—22 T; 329—106